United States Patent [19]

Kolleas

[11] 4,355,551

[45] Oct. 26, 1982

[54] CHAIN SAW BAR ATTACHMENT

[76] Inventor: Pete D. Kolleas, 10855 SW. Park St., Tigard, Oreg. 97223

[21] Appl. No.: 164,328

[22] Filed: Jun. 30, 1980

[51] Int. Cl.$^3$ ............................................. B23D 63/16
[52] U.S. Cl. ................................. 76/78 R; 76/25 A
[58] Field of Search ..................... 76/25 A, 31, 36, 37, 76/74, 77, 78 R, 78 A; 30/381, 385, 386, 387, 122, 138

[56] References Cited

U.S. PATENT DOCUMENTS

| | | | |
|---|---|---|---|
| 2,413,919 | 1/1947 | Huffsmith . | |
| 2,532,981 | 12/1950 | Wolfe | 30/385 |
| 2,589,165 | 3/1952 | Toy et al. . | |
| 2,693,724 | 11/1954 | Currie . | |
| 2,703,928 | 3/1955 | Southwick | 30/386 |
| 2,839,097 | 6/1958 | Siria | 30/122 |
| 2,910,099 | 10/1959 | Mall | 30/385 |
| 2,992,660 | 7/1961 | Merz | 30/386 |
| 3,029,663 | 4/1962 | Thar, Jr. . | |
| 3,083,591 | 4/1963 | Travis . | |
| 3,114,275 | 12/1963 | Paul . | |
| 3,191,646 | 6/1965 | Merz | 30/387 |
| 3,414,026 | 12/1968 | Merz | 30/386 |
| 3,768,341 | 10/1973 | Fitzpatrick . | |

*Primary Examiner*—Roscoe V. Parker

*Attorney, Agent, or Firm*—Klarquist, Sparkman, Campbell, Leigh, Whinston & Dellett

[57] ABSTRACT

A chain saw bar attachment is disclosed for a conventional chain saw bar which has a peripheral track for guiding a saw chain and which is detached from a chain saw. The attachment includes an elongated body, a mounting mechanism for mounting the body to the bar with a free end projecting outwardly beyond the connecting end of the bar, and a saw chain guiding member defining an arcuate guideway for receiving and guiding a saw chain carried by the bar from the track at one side edge of the bar, about the connecting end of the bar, and to the track at the other side edge of the bar as the saw chain is sharpened. In one form, the saw chain guiding member may comprise a sprocket wheel having teeth which engage links of a saw chain and a mechanism for turning the sprocket wheel to move the saw chain about the bar. In alternate forms, the guiding member may comprise a slotted roller wheel rotatably connected to the body or a stationary arcuate guideway defining member. The mounting mechanism permits selective sliding of the attachment toward the nose end of the bar to permit insertion and removal of the saw chain into the arcuate guideway and away from the nose end of the bar to apply the desired amount of tension to the saw chain.

5 Claims, 5 Drawing Figures

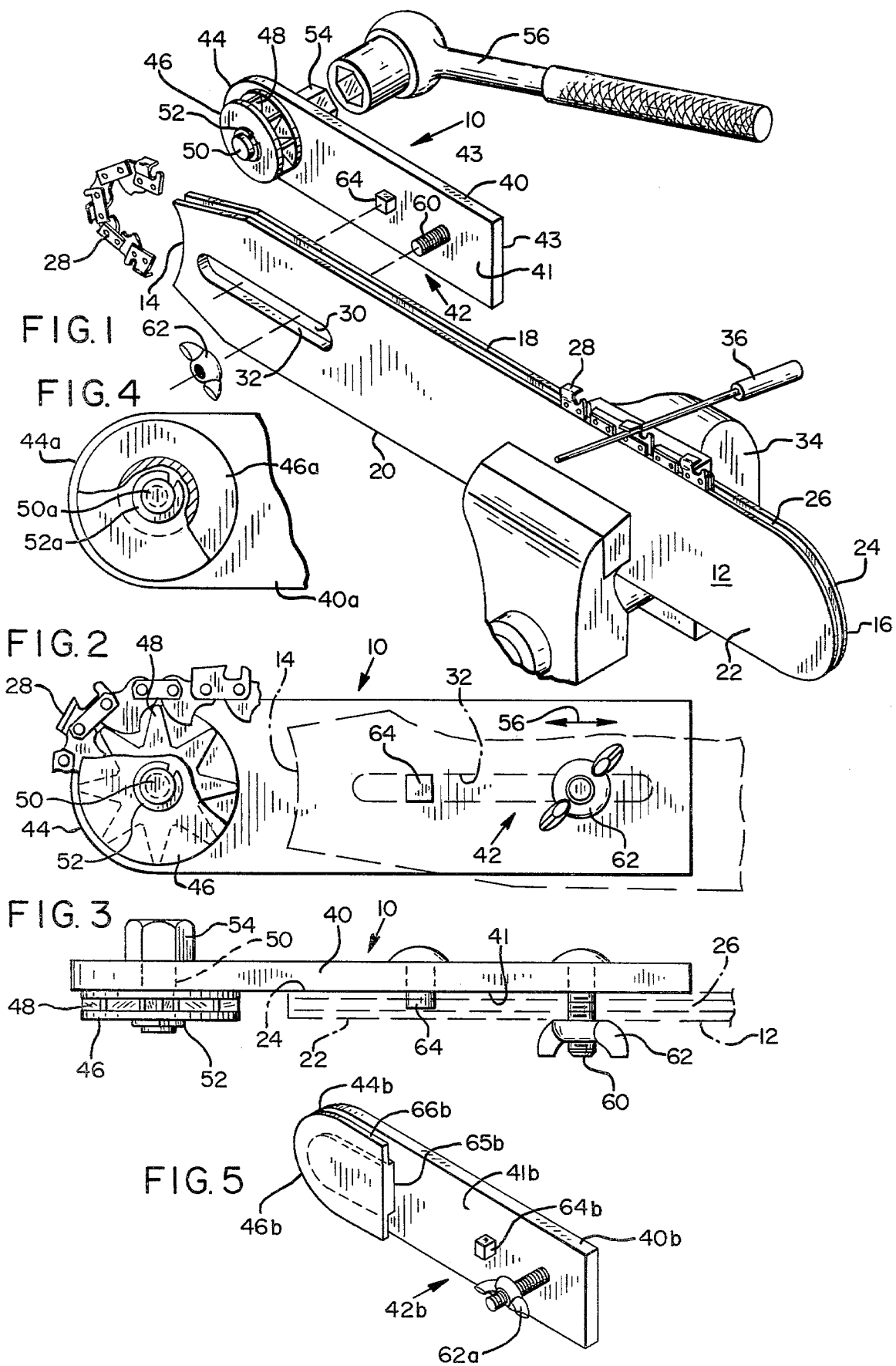

CHAIN SAW BAR ATTACHMENT

BACKGROUND OF THE INVENTION

1. Field of the Invention

This invention relates broadly to devices for holding a saw chain during sharpening and more specifically to such devices which are attached to a chain saw bar which is detached from a chain saw.

2. Description of the Prior Art

When chain saws are used heavily, such as by loggers, the saw chains quickly become dull. This is especially true if the wood contains grit, other abrasive material or is dry. To avoid having to waste time sharpening saw chains at the job site, it is common to carry a number of spare saw chains. As a saw chain becomes dull, it is then replaced with a sharp chain. These dull saw chains are subsequently resharpened.

One common type of device for resharpening saw chains is clamped directly to a chain saw bar of an assembled chain saw. The saw chain is then sharpened while carried by the bar of the assembled saw. However, in order to sharpen a spare chain, the saw must be dismantled, the sharpened chain removed and replaced with a dull chain and the saw reassembled. This disassembly and reassembly of a chain saw is time consuming and this problem is magnified when a number of dull chains must be sharpended. Furthermore, it is difficult to reassemble a saw with a correct tension and alignment on the saw bar and chain for sharpening purposes. U.S. Pat. Nos. 2,693,724, 3,029,663, 3,083,591, and 3,768,341 exemplify these types of devices.

In another known type of saw chain sharpener, a saw chain is removed from a chain saw bar and a bench vice is used to clamp a section of the saw chain while cutter links on this section are sharpened. However, such devices must be repeatedly loosened in order to move another section of saw chain into position for clamping and sharpening. Thus, sharpening of saw chains is unusually time consuming. U.S. Pat. No. 3,114,275 exemplifies this type of saw chain sharpener.

Still other types of sharpening devices use a specialized mechanism for supporting a saw chain during sharpening. These devices are typically complex, costly, and bulky. Devices of this nature are shown in U.S. Pat. Nos. 2,413,919 and 2,589,165.

Therefore, a need exists for a device which facilitates saw chain sharpening which solves these and other problems.

SUMMARY OF THE INVENTION

The invention comprises an attachment for a conventional saw chain bar, the bar being detached from a chain saw, which guides a saw chain positioned in the peripheral track of the bar about the connecting end portion of the bar as the saw chain is sharpened. More specifically, the device includes a body, mounting means for mounting the body to a connecting end portion of a chain saw bar, and a saw chain guide means carried by the body for guiding the saw chain from the saw chain guiding track at one side edge of the bar, about the connecting end portion of the bar, and to the track along the other side edge of the bar.

As one feature of the invention, the body has a free end projecting outwardly from the connecting end of the bar and the saw chain guide means defines an arcuate guideway at the free end of the body and positioned generally in the plane of the peripheral track of the bar so as to receive and guide a saw chain about the connecting end of the bar.

As a specific feature of one embodiment of the invention, this saw chain guide means comprises a sprocket wheel mounted to the free end of the body and having teeth for engaging the links of the bar and which is adapted for engagement by a rotation imparting device which rotates the sprocket wheel and moves the saw chain about the chain saw bar as it is sharpened.

As a specific feature of an alternate embodiment of the invention, the saw chain guiding means comprises a slotted roller wheel rotatably mounted to the free end of the body and positioned such that links of the saw chain are received into and guided by the slot of the wheel.

As a specific feature of still another embodiment of the invention, the saw chain guiding means defines a stationary arcuate guideway at the free end of the body for receiving and guiding links of the saw chain about the connecting end of the bar.

As a further feature of the invention, the mounting means permits axial sliding of the saw chain guide means relative to the bar such that sliding of the saw chain guide means in one direction permits insertion of the saw chain into the guideway and sliding the saw chain guide means in the opposite direction tensions the saw chain a desired degree.

As a another feature of the invention, the saw chain mounting means comprises means for slidably engaging an elongated slot through a connecting end portion of a conventional bar such that axial sliding of the body and hence of the saw chain guide means is permitted.

It is a primary object of the invention to provide an attachment for mounting to a chain saw bar, the bar being disconnected from a chain saw, which supports and guides a saw chain carried by the bar as the saw chain is sharpened.

It is another object to provide such an attachment which is compact, lightweight and easy to manufacture.

It is a further object of the invention to provide such an attachment which is mechanically simple and which is extremely reliable and trouble-free during use.

It is another object of the invention to provide such an attachment which is readily installable and removable from a chain saw bar.

A further object of the invention is to provide such an attachment capable of adjusting and relaxing the tension of a saw chain carried by the bar and supported by the attachment.

It is another object of the invention to provide such an attachment to which a saw chain can rapidly be mounted for sharpening and released when sharp.

A still further object of the invention is to provide such an attachment usable in sharpening saw chains without requiring specialized additional equipment.

BRIEF DESCRIPTION OF THE DRAWINGS

The above and other objects, features and advantages of the invention will become apparent from the following description, when read in conjunction with the accompanying drawings, in which:

FIG. 1 is a perspective view of the attachment shown together with a conventional rotation imparting tool, chain saw bar, file, and vice for holding the chain saw bar;

FIG. 2 is a side elevational view of the attachment of FIG. 1 with a portion of the saw chain guide thereof broken away;

FIG. 3 is a top plan view of the attachment of FIG. 1;

FIG. 4 is a side elevational view of a portion of another embodiment of a saw chain guide of the invention with a portion thereof broken away; and FIG. 5 is a perspective view of a further embodiment of a chain saw attachment in accordance with the invention.

DETAILED DESCRIPTION OF PREFERRED EMBODIMENTS

An attachment in accordance with the invention is indicated generally at 10 in FIG. 1 and is shown in conjunction with a conventional chain saw bar 12 which is detached from a chain saw. The bar has a connecting end 14, which is connected to the housing of a chain saw when the saw is assembled, a nose end 16, first and second side edges 18, 20 and first and second planar faces 22, 24. A saw chain guiding track 26 is provided at the peripheral of the bar along side edge 18, nose 16, and side edge 20. Links of a continuous saw chain 28, only a portion of which is shown in FIG. 1, are received and guided in this track. In addition, an elongated slot 30 or opening is provided through a connecting end portion of the bar and is defined by a slot defining wall 32. This slot extends lengthwise in a direction from the connecting end 14 to the nose end 16 of the bar. In addition, the bar is shown clamped in a conventional work bench vice 34 and a round file 36 is shown in position for sharpening one cutter link of chain 28.

Attachment 10 includes an elongated body 40, mounting means 42 for mounting the body to the chain saw bar with a free end 44 of the body projecting outwardly beyond the connecting end 14 of the bar and a saw chain guiding means, such as a sprocket wheel 46, for guiding a saw chain from the track at one side edge of the bar, about the connecting end of the bar and to the track at the other side edge of the bar.

Body 40, in the illustrated form, comprises an elongated generally rectangular planar plate-like support having a first planar surface 41 which is positioned adjacent surface 21 or 22 of the bar when the attachment is mounted in operating position and a second planar surface 43 opposite the first surface. When mounted, free end 44 of the body projects outwardly beyond the connecting end of the bar with the longitudinal axis of the body parallel to the longitudinal axis of the bar. Also, the corners of the support at free end 44 are rounded so that they do not impede movement of the saw chain about the bar during sharpening.

Although the attachment can be varied in size to fit any size of a chain saw bar, it is extremely compact. As a specific example, an attachment which is approximately five and one-half inches long and one and one-half inches wide is suitable for many conventional sixteen inch chain saw bars. Thus, the attachments are portable if desired and do not require a great deal of storage space. Therefore, the attachment is convenient for consumers who only occasionally use a chain saw as well as for industrial users of chain saws.

In addition, the attachments can be manufactured of any suitable preferably rigid material. For example, of metal such as aluminum or of a synthetic material such as of a rigid polymer.

Sprocket wheel 46 includes plural teeth 48 which engage links of the saw chain 28, such as shown in FIG. 2, as the saw chain passes about the connecting end of the bar. At any one time, only approximately the outermost half of sprocket wheel 46 engaes links of the saw chain. This engaging portion of the sprocket wheel thus defines a curved or arcuate guideway, in this case a semicircular guideway, for directing the saw chain about the connecting end of the bar. Furthermore, as can be seen in FIG. 3, the guideway defined by sprocket wheel 46 is generally positioned in a plane parallel to faces 22, 24 of the bar and containing the track 26 at the periphery of the bar. In other words, the guideway defined by sprocket wheel 46 is generally in alignment with track 26.

A coupling means is also provided for transmitting rotational motion to sprocket wheel 46 and in turn move the chain about the bar as it is sharpened. In the illustrated form, this coupling means includes a pin 50 which is rotatably mounted to body 40 with a longitudinal axis normal to the plane containing the guideway and track 26. In addition, sprocket wheel 46 is rigidly mounted to pin 50, such as, for example, by welding, press fitting or keying, so that rotation of pin 50 in turn rotates the sprocket wheel. A keeper ring 52 maintains sprocket wheel 46 in place. Also, pin 50 has a head shaped for engagement by a rotation imparting device, such as hex head 54 engageable by a hex head ratchet 56. With this construction, rotation of the head 54 by ratchet 56 causes a corresponding rotation of pin 50 and of sprocket wheel 46. As a result of the engagement of teeth 48 of the sprocket wheel to links of the chain, the chain moves about the periphery of the bar. Thus, after a number of links have been filed by file 36, the chain can readily be moved to position additional links for sharpening. Also, with ratchet 56 employed to move the chain, the sharp cutter links need not be gripped by an individual to move the saw chain.

Mounting means 42 preferably releasably mounts body 40 and hence the saw chain guiding means to the chain saw bar. In addition, the mounting means comprises a tensioning means which mounts the saw chain guiding means in a manner for motion in the direction of arrows 56 shown in FIG. 2 toward and away from the nose end of the bar. More specifically, mounting means mounts body 40 to the bar in a manner that permits axial sliding of the body 40 and hence sprocket wheel 46 toward and away from the nose of the bar. In addition, mounting means 42 permits movement of sprocket wheel 46 a sufficient distance toward nose 16 so that the chain 28 can easily be inserted and removed from the sprocket wheel. In addition, the sprocket wheel can be slide away from the nose of the bar as desired to apply a predetermined and adjustable tension to the saw chain. In the illustrated preferred embodiment, mounting means 42 comprises a means which is insertable into slot 30 of the bar and which slidably engages the wall 32 defining this slot. More specifically, the mounting means comprises an externally threaded clamping pin 60 which projects perpendicularly outwardly from surface 41 of body 40 and is positioned to extend through the slot 30 with a projecting end portion extending beyond the face 22 of the bar. A threaded clamping member such as wing nut 62 is threaded onto pin 60. Rotation of the wing nut 62 in one direction shifts it axially along bolt 60 toward face 22. Continued rotation of nut 62 in this direction causes it to grip the bar and rigidly clamp the attachment in place. Conversely, loosing of wing nut 62 by rotating it in the opposite direction permits the attachment to slide toward and away from the nose 16 for adjusting tension on the saw chain. Also, the illustrated mounting means includes a guide pin 64 which projects perpendicularly outwardly from surface 41 and is positioned for insertion into slot 30. As can be seen in FIG. 2, guide pin 64 is of square cross section and of a width substantially equal to the width of slot 30. Consequently, guide pin 64 prevents rotation of the free end of the attachment, for example, about an axis of pin 60, while not interferring with the desired sliding motion of the attachment.

In the alternate embodiment shown in FIG. 4, the saw chain guiding means comprises a slotted pulley or roller wheel 46a rotatably coupled by a pin 50a to the free end 44a of the body 40a. The links of the saw chain 28 are thus positioned in an arcuate guideway consisting of the outermost portion of the slot defined by the wheel 46a.

In the FIG. 5 embodiment of the invention, the saw chain guiding means comprises a plate-like saw chain guiding member 46b mounted to the free end portion of body 40b. An inner surface 65b of the member 46b is positioned adjacent to surface 41a of the body. A slot defining portion 66b of the margin of surface 64a, which is adjacent to the peripheral margin of the first surface 41a at the free end of the body, is parallel to and laterally spaced from this peripheral margin. As a result, an arcuate guideway is defined between the peripheral margins of the free end of body 40b and of guide member 46b. This guideway is also generally in the plane of the track of this saw chain bar.

In operation, the FIG. 1 attachment is typically mounted to a spare chain saw bar detached from a chain saw. A dull saw chain is mounted into the track of the bar and also into the guideway of sprocket wheel 46. Wing nut 62 is loosened as required to permit sliding of the attachment a sufficient distance toward the nose 16 to permit insertion of the saw chain into this guideway. Thereafter, the attachment is slid in the opposite direction until the desired tension is applied to the saw chain at which time wing nut 62 is tightened to clamp the attachment in place. The chain saw bar is held in vice 34 and the set of cutter links facing one direction are sharpened by file 36. Wrench 56 is used to turn sprocket 46 and move the saw chain about the bar to bring additional links into position for sharpening. Of course, the chain can be grasped directly and slid about the bar if a wrench 56 is unavailable or in the event the saw chain guide member takes the forms of FIG. 4 and FIG. 5. After the set of cutter links are sharp, the bar may be flipped one hundred and eightly degrees in the vice so that the set of cutter links facing the other direction can then be sharpened.

Thus, a compact, easily operated chain saw bar attachment for use in sharpening saw chains is provided. In addition, additional bulky, complex and specialized equipment are not required because the attachment is used together with common tools such as a file and work bench vice.

Having illustrated and described the principles of my invention with reference to several preferred embodiments, it should be apparent to those skilled in the art that such invention may be modified in arrangement and detail without departing from such principles. I claim as my invention all such modifications which come within the true spirit and scope of the following claims.

I claim:

1. A chain saw bar attachment for a chain saw bar having a peripheral track for guiding a saw chain and which is detached from a chain saw comprising:

an elongated body;

mounting means for mounting said body to the connecting end portion of the bar with a free end portion of the body projecting outwardly from the connecting end; and said body including a first elongated planar face which abuts one side surface of the chain saw bar and a free end which projects outwardly from the chain saw bar when the body is mounted, the free end of said body having a first peripheral edge of arcuate shape; and a nonrotatable saw chain guiding member mounted to the free end of said body, said saw chain guiding member having a second peripheral edge of an arcuate shape which is positioned parallel to and spaced from the first peripheral edge so as to define an arcuate saw chain guide track therebetween which is generally in the plane of the track of the saw chain bar so as to guide saw chain carried by the bar from the track at one side edge of the bar, about the connecting end of the bar and to the track at the other side edge of the bar as the saw chain is sharpened.

2. A chain saw bar attachment according to claim 1 in which said mounting means releasably mounts said body to the bar and in which said body is released to permit motion of said body in first and second directions and corresponding motion of said saw chain guiding means.

3. A chain saw bar attachment for a chain saw bar having a peripheral track for guiding a saw chain and which is detached from a chain saw, the bar having a nose end, a connecting end, and a slot defining wall which defines an enlongated slot through the bar adjacent to its connecting end, the slot extending lengthwise in a direction from the connecting end toward the nose end of the bar, the attachment comprising:

an elongated body;

mounting means for releasably engaging the slot defining wall to mount the body to a connecting end portion of the bar with a free end portion of the body projecting outwardly from the connecting end;

said body comprising a planar plate-like elongated support having a first face positioned adjacent one surface of the chain saw bar when the body is mounted, the free end of the support being of arcuate shape, a nonrotatable plate-like saw chain guiding member which is mounted to the free end of said support with a second surface adjacent the first surface of said support, the portion of the margin of said second surface which is adjacent to the peripheral margin of the first surface at the free end of said support being parallel to and spaced from such peripheral margin so that an arcuate guideway is defined between such margins, such arcuate guideway being generally in the plane of the track of the saw chain bar.

4. A chain saw bar attachment according to claim 3 in which said mounting means comprises means projecting from the first face of said body for slidably engaging the slot defining wall so as to permit sliding motion of the mounting means and thereby the body and saw chain guiding means relative to the bar and means for clamping said mounting means to the bar to selectively prevent and enable such sliding motion.

5. A chain saw attachment according to claim 4 in which said mounting means comprises a guide pin projecting from said body and extending into the slot and an externally threaded clamping pin spaced from the guide pin and extending into the slot with a free end projecting outwardly from the slot, said clamping means comprising a threaded stop threaded onto the projecting end of said clamping pin such that rotation of said threaded stop in one direction shifts the stop axially away from the bar and permits sliding of said mounting means, body and saw chain guiding means toward the nose of the bar a sufficient distance to permit insertion of the saw chain into the arcuate guideway and away from the nose of the bar to tighten the inserted saw chain, and such that rotation of said threaded stop in the opposite direction shifts the stop axially toward the bar and clamps the saw chain mounting means to the bar to prevent such sliding motion.

* * * * *